United States Patent [19]

Hanson et al.

[11] Patent Number: 5,625,180
[45] Date of Patent: Apr. 29, 1997

[54] DATA CAPTURE SYSTEM WITH COMMUNICATING AND RECHARGING DOCKING APPARATUS AND HAND-HELD DATA TERMINAL MEANS COOPERABLE THEREWITH

[75] Inventors: George E. Hanson; Phillip Miller; Darald R. Schultz; Jerry L. Walter; Darrell L. Boatwright, all of Cedar Rapids, Iowa

[73] Assignee: Norand Corporation, Cedar Rapids, Iowa

[21] Appl. No.: 387,530

[22] Filed: Feb. 13, 1995

Related U.S. Application Data

[60] Division of Ser. No. 50,704, Apr. 21, 1993, abandoned, which is a continuation-in-part of Ser. No. 909,139, Jul. 6, 1992, abandoned, which is a continuation of Ser. No. 345,200, Apr. 28, 1989, abandoned, which is a continuation-in-part of Ser. No. 305,302, Jan. 31, 1989, abandoned, which is a continuation-in-part of Ser. No. 136,097, Dec. 21, 1987, abandoned.

[51] Int. Cl.[6] ................................................. G06K 7/10
[52] U.S. Cl. ............................................. 235/462; 235/472
[58] Field of Search .............................. 235/472, 462; 320/2

[56] References Cited

U.S. PATENT DOCUMENTS

| | | | |
|---|---|---|---|
| 3,390,319 | 6/1968 | Robinson | 320/2 |
| 3,621,265 | 11/1971 | Berler et al. | |
| 3,659,180 | 4/1972 | Urbush | 320/2 |
| 4,251,798 | 2/1981 | Swartz et al. | 235/462 |
| 4,258,253 | 3/1981 | Fisher . | |
| 4,345,146 | 8/1982 | Story et al. | |
| 4,377,741 | 3/1983 | Brekka et al. | |
| 4,387,297 | 6/1983 | Swartz et al. | 235/472 |
| 4,458,238 | 7/1984 | Learn . | |
| 4,460,120 | 7/1984 | Shepard et al. | 235/472 |
| 4,471,218 | 9/1984 | Culp | 235/472 |
| 4,496,831 | 1/1985 | Swartz et al. | 235/462 |
| 4,603,262 | 7/1986 | Eastman et al. | 235/472 |
| 4,628,193 | 12/1986 | Blum . | |
| 4,684,793 | 8/1987 | Kamhuber . | |
| 4,706,096 | 11/1987 | Sato . | |
| 4,713,617 | 12/1987 | Michalski . | |
| 4,721,849 | 1/1988 | Davis et al. | 235/472 |
| 4,757,183 | 7/1988 | Karey et al. | 320/2 |
| 4,758,717 | 7/1988 | Shepard et al. | 235/472 |
| 4,760,248 | 7/1988 | Swartz et al. | 235/472 |
| 4,805,175 | 2/1989 | Knowles | 235/472 |
| 4,808,018 | 2/1989 | Robertson et al. . | |
| 5,157,687 | 10/1992 | Tymes | 235/472 |

FOREIGN PATENT DOCUMENTS 0385502  2/1990  European Pat. Off. .

OTHER PUBLICATIONS

P.J. Kennedy, "Hand-Held Data Input Device," IBM Technical Disclsoure Bulletin, vol. 26, No. 11, Apr. 1984, pp. 5826–5827.

*Primary Examiner*—John Shepperd
*Attorney, Agent, or Firm*—Suiter & Associates PC

[57] ABSTRACT

In an exemplary embodiment, a hand-held data terminal has external electrical contact pads which mate with resilient contacts of a docking receptacle for the interchange of data and possibly the supply of charging current to the terminal. The terminal may be loaded into and removed from the docking receptacle in a single motion with one hand. Keyboard and display (user interface) of the terminal are fully accessible while in the docking receptacle. The terminal may be fully sealed and be completely free of the conventional pin and socket type electrical connector fittings at its exterior.

12 Claims, 5 Drawing Sheets

DATA CAPTURE SYSTEM WITH COMMUNICATING AND RECHARGING DOCKING APPARATUS AND HAND-HELD DATA TERMINAL MEANS COOPERABLE THEREWITH

The present application is a divisional application of Ser. No. 08/050,704 filed Apr. 21, 1993 (abandoned) which is a continuation-in-part of application Ser. No. 07/909,139 filed Jul. 6, 1992 (abandoned) which in turn is a continuation of application of application Ser. No. 07/345,200 filed Apr. 28, 1989 (abandoned) which in turn is a continuation-in-part of application Ser. No. 07/305,302 filed Jan. 31, 1989 (abandoned) which in turn is a continuation-in-part of application Ser. No. 07/136,097 filed Dec. 21, 1987 (abandoned).

BACKGROUND OF THE INVENTION

In the data capture field, there are many applications where hand-held data terminals should be of rugged construction so as to survive rough handling. Many operators are not inclined toward painstaking or precise manipulations. An example is in the use of RF data capture terminals on forklift trucks in factories and warehouses where items to be transported are identified by bar codes. Other examples are found in the field of route delivery and direct store delivery where many items are handled and the terminal means automates the accounting function. Even in applications where bar code data is transmitted on-line to a central station, it may be desirable for hand-held terminals to be inserted into docking apparatus for the interchange of data signals e.g., the loading of scheduling information or the like into the terminal at the beginning of a working shift. Further where terminal means has memory capacity for accumulating data during a delivery operation or the like, it may be desirable for such data to be transferred to a printer so that a hard copy may be produced. In cases where rechargeable batteries are used, the docking apparatus may provide for the recharging of such batteries at the same time as data communication is taking place.

It is conceived that it would be highly advantageous to provide a data capture system with docking apparatus adaptable to a wide range of terminal means, and which furthermore could be quickly and simply loaded in a relatively foolproof manner, and without requiring attention and care from operators engaged in physically demanding and arduous work routines. A docking apparatus would be desirable that completely avoids the use of mating pin and socket type electrical connections, and that does not rely on a specialized configuration of the terminal, e.g., the provision of an optical scanner tip which may be used for data communication.

SUMMARY OF THE INVENTION

The present invention relates particularly to data capture systems utilizing portable data terminal means which are to be held in one hand during data capture operation; however the invention is also applicable to portable data terminal means which may be mounted e.g., on a belt or e.g., on a vehicle during data capture operation. The data terminal means preferably will be of size and weight to be held in one hand, even though not so held during data capture operation. Also the data terminal means may be provided with batteries so as to be capable of portable operation, and such batteries may be rechargeable.

In a typical case, the portable data terminal means will have user interface means such as a manually operated data input (e.g., a keyboard) and/or a data output (e.g., a liquid crystal display), and will contain data storage means for the storage of programming instructions and/or program data, and/or for the storage of data capture information.

In accordance with an important aspect of the present invention, a docking apparatus removably receives portable data terminal means for purposes of data communication e.g., with a host computer and/or for the recharging of rechargeable batteries, and is so configured that the terminal means may have electrical contact pad means generally flush with the exterior of the terminal means. Preferably an abutting type engagement between the terminal contact pad means and cooperating electrical contact means of the docking apparatus is used for each electrical connection which is required at the docking apparatus, and the typical pin and socket type docking connections are entirely avoided.

In accordance with another aspect of the invention the same basic docking structure may be provided with greater or lesser numbers of contact positions. For example, one type of hand-held terminal intended for on-line RF communication with a host computer may have six contact pads for coupling with a local area network, and may have a nine position electrical connector for compatibility with an earlier type of interface system requiring inter-fitting of pin and socket connectors; another type of hand-held terminal designed for route accounting applications may have e.g., twelve external contact pads and be intended for interfacing only with systems having provision for open abutment type interconnection.

In an early embodiment as well as in a variety of later embodiments, the terminal receptacle means has been arranged so that with the terminal secured therein, the or each line of the terminal display remains visually observable in a convenient orientation relative to a driver of a vehicle for example. Also all of the key positions of the terminal keyboard are manually accessible, the legends on the keyboard having an orientation so as to be conveniently readable, e.g., by the driver of the vehicle. In particular the axis of each line of the display and of each row of key positions should be generally horizontal (rather than vertical) and the alphanumeric characters of the terminal display and keyboard legends should be upright (rather than inverted) as viewed by the operator.

Also in the early embodiment the terminal could be inserted into the receptacle with one hand against the action of a resilient bias stronger than the bias on the receptacle mating contacts. The same resilient bias allowing one handed loading, then served to firmly position the terminal for steady reliable electrical contact at each abutting type contact position in spite of vehicle jarring and vibration or the like.

The receptacle in the early embodiment was provided with a pair of standard nine pin D-sub connectors with threaded fastening of mating pin connectors, and with a power connector, so that a terminal while inserted into the receptacle could receive data from vehicle sensors via one nine pin connector, transmit commands via the other nine pin connector, and receive operating and/or charging power from the vehicle electric power system via the power connector.

In a preferred embodiment, the present invention comprises an indicia reading system for reading indicia having parts of different light reflectivity, e.g., a bar code scanner. The housing is preferably gun-shaped and includes a keypad for manual data entry and a window to allow reflected light to pass therethrough without obstructing operation of the keyboard.

Other objects, features and advantages will be apparent from the following detailed description, taken in connection with the accompanying drawings, and from the individual features and relationships of the respective appended claims.

BRIEF DESCRIPTION OF THE DRAWING FIGURES

FIG. 1 is a diagrammatic illustration of a vehicle data system showing a docking system in accordance with the present invention, and which may represent a data system associated with a gasoline-powered or battery-powered material handling vehicle such as a forklift truck.

FIG. 2 is a somewhat diagrammatic partial vertical sectional view illustrating constructional details of a docking apparatus for the system of FIG. 1, a portable battery powered terminal corresponding to that of FIG. 1 being shown as being inserted part way into the docking channel, to the point of initial electrical contact; and also indicating in diagrammatic fashion a laser bar code scanner device in a separate vehicle mounting or holster means and coupled with the terminal via an extendible coiled cable.

Figure 5A:
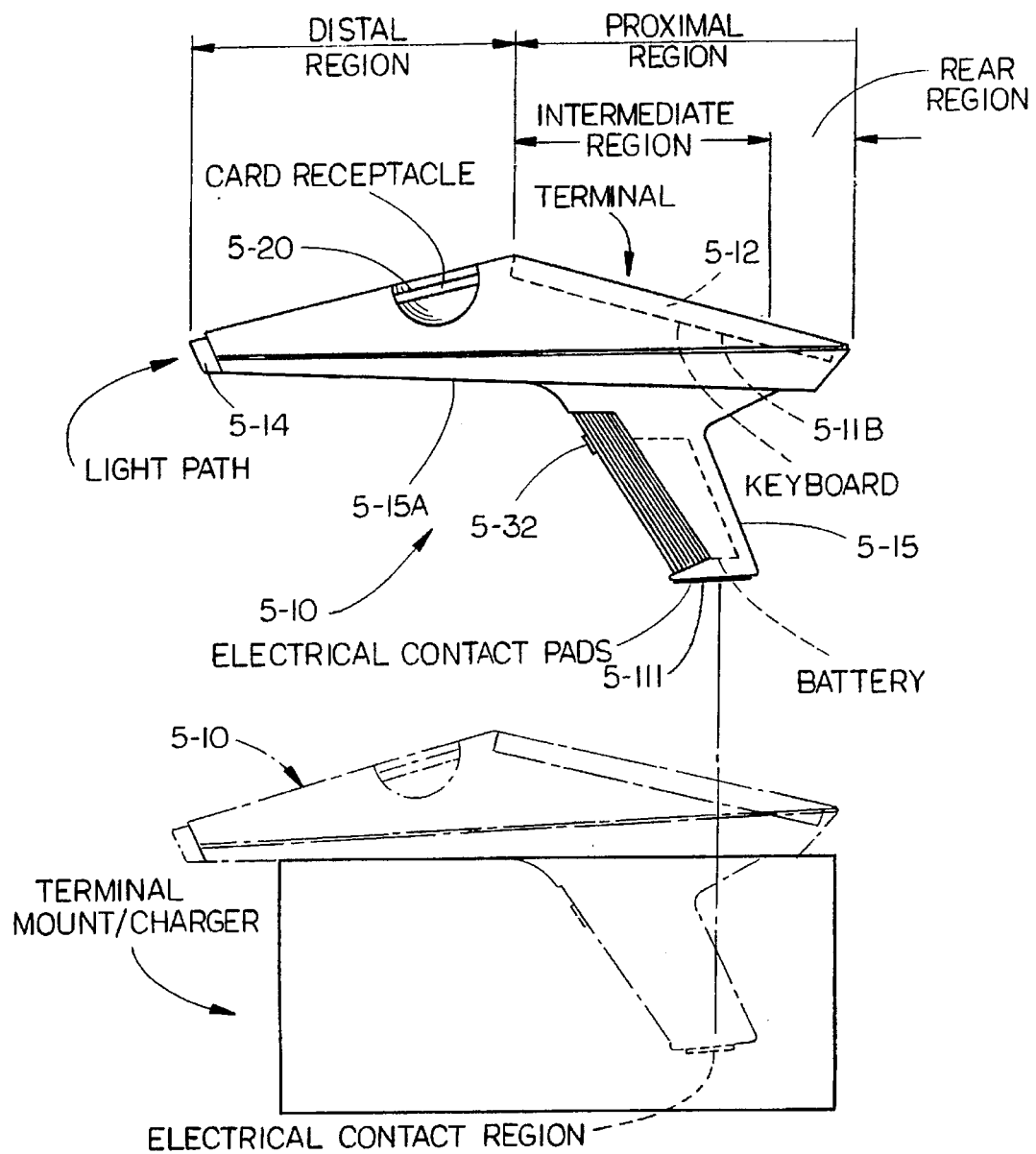

FIG. 5A is a diagrammatic view showing a data terminal and scanner means forming a single unit with a generally gun-shaped or pistol-shaped housing, and showing a terminal mount/charger, the data terminal and scanner means being shown in solid outline in a first position above the terminal mount/charger, and being shown in dot-dash outline in a second position as received by the terminal mount/charger.

Figure 1:
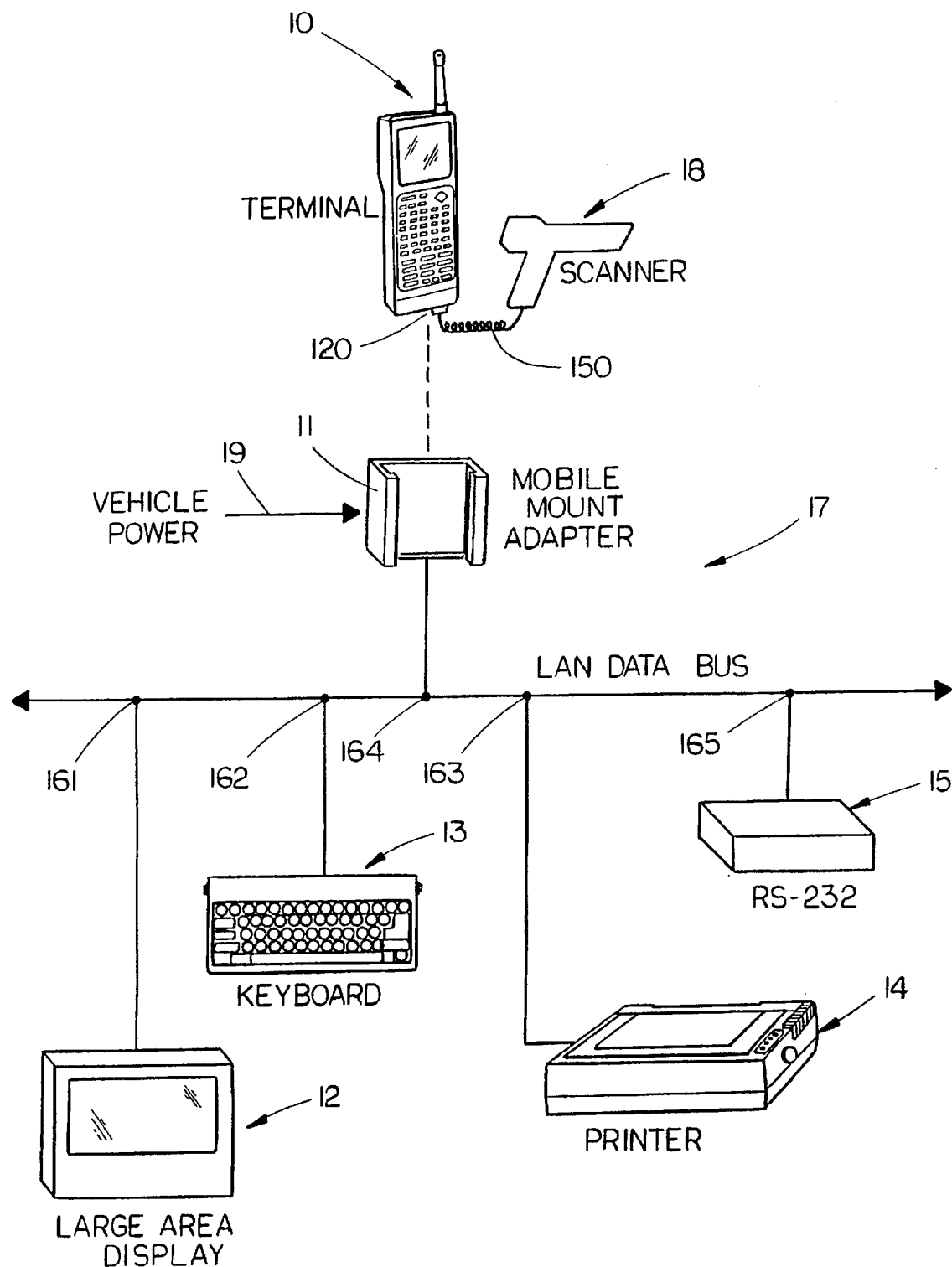
Figure 5B:
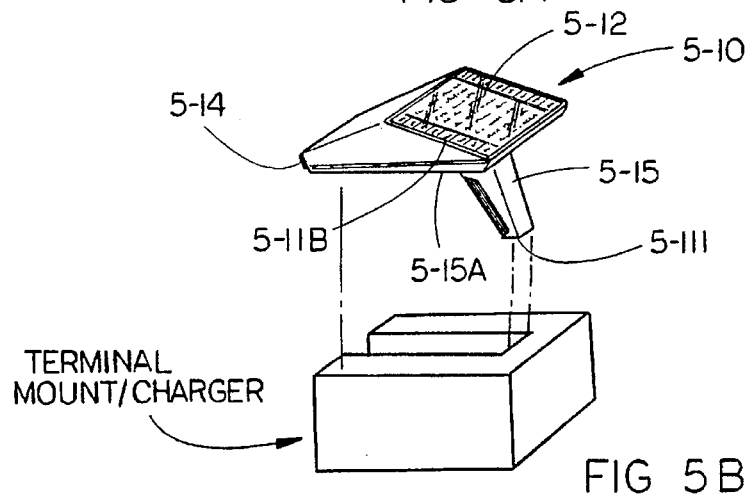

FIG. 5B is a purely diagrammatic pictorial indication of the channel configuration of the adapter of FIG. 1, and also shows a somewhat diagrammatic perspective view of the data terminal and scanner means of FIG. 5A, which corresponds to the first figure of an application of Phillip Miller et al., U.S. Ser. No. 07/136,097 filed Dec. 31, 1987, now abandoned.

DETAILED DESCRIPTION

FIG. 1 shows a portable battery operated data terminal 10 which may be connected by means of a docking unit 11 with one or more peripheral devices such is 12–15 (e.g., devices that might be particularly suited for forklift truck applications), the terminal and peripheral devices being coupled via a local area network data bus 16 of a self-propelled manually steered vehicle 17. For the case of a forklift truck 17, docking units such as 11 may releasably accommodate terminals such as terminal 10 which receive and store data obtained by means of an optical bar code or RF tag scanner 18. As indicated at 19, vehicle power is generally available from the electrical system of the vehicle. Certain electric vehicles such as lift trucks may operate from voltages as high as 72 volts, so higher voltage operation must be accommodated as well as the more typical value of twelve volts.

A preferred LAN configuration for the embodiment of FIG. 1 may have the characteristics as described in detail in the incorporated pending application of George E. Hanson et al U.S. Ser. No. 07/305,302 filed Jan. 31, 1989 "VEHICLE DATA SYSTEM", Attorneys Docket No. 6649.

A general characteristic of the LAN connected device in FIGS. 1 is that communication and control intelligence is required to receive and transmit information through the LAN. The terminal (e.g., terminal 10, FIG. 1) with its processor and memory system may serve as a communication controller or primary processor while each peripheral device (such as 12–15, FIG. 1) may comprise a secondary unit which typically contains a microcomputer to perform communication and control tasks. Certain applications may involve multiple terminals connected to a single LAN data bus such as vehicle bus 16, FIG. 1, or such as LAN data bus 27 of fixed installation 28. Multiple adapters such as 31–36 enable communication from terminal to terminal, and from any of multiple terminals to an RS-232 interface means such as 15, FIG. 1. Such an interface may be used for data interchange with a host computer system overseeing a multiplicity of vehicles (such as 17, FIG. 1) or fixed and may include the LAN controller.

Vehicle mounted terminals such as terminal 10, FIG. 1, may be removed from vehicle docking units such as 11 at the end of a working shift and physically inserted into one of the docking units 31–36 of a fixed installation 28 f5 or transfer of accumulated data to a host computer. Components 15 and 37 may comprise LAN controller and protocol converters for adapting to an external RS-232 transmission system. Alternatively, a vehicle such as 17 could itself be coupled with a host computer via interface means 15, e.g., while for the case of an electrically driven vehicle, the vehicle batteries were being recharged. In each case, the batteries of the terminal would be recharged e.g., from AC power. Where interface means 15, FIG. 1, does not include the LAN controller, terminals such as 10 may be automatically switched when in docking unit 11 so as to activate primary LAN programming enabling the microcomputer of terminal 10 to act as the LAN controller when on board vehicle 17. When such a terminal 10 is inserted in one of docking units 31–36 on the other hand, the terminal would operate as a standard secondary unit, and be identified dynamically by means of the primary programming of the LAN controller of interface means 37.

Figure 2:
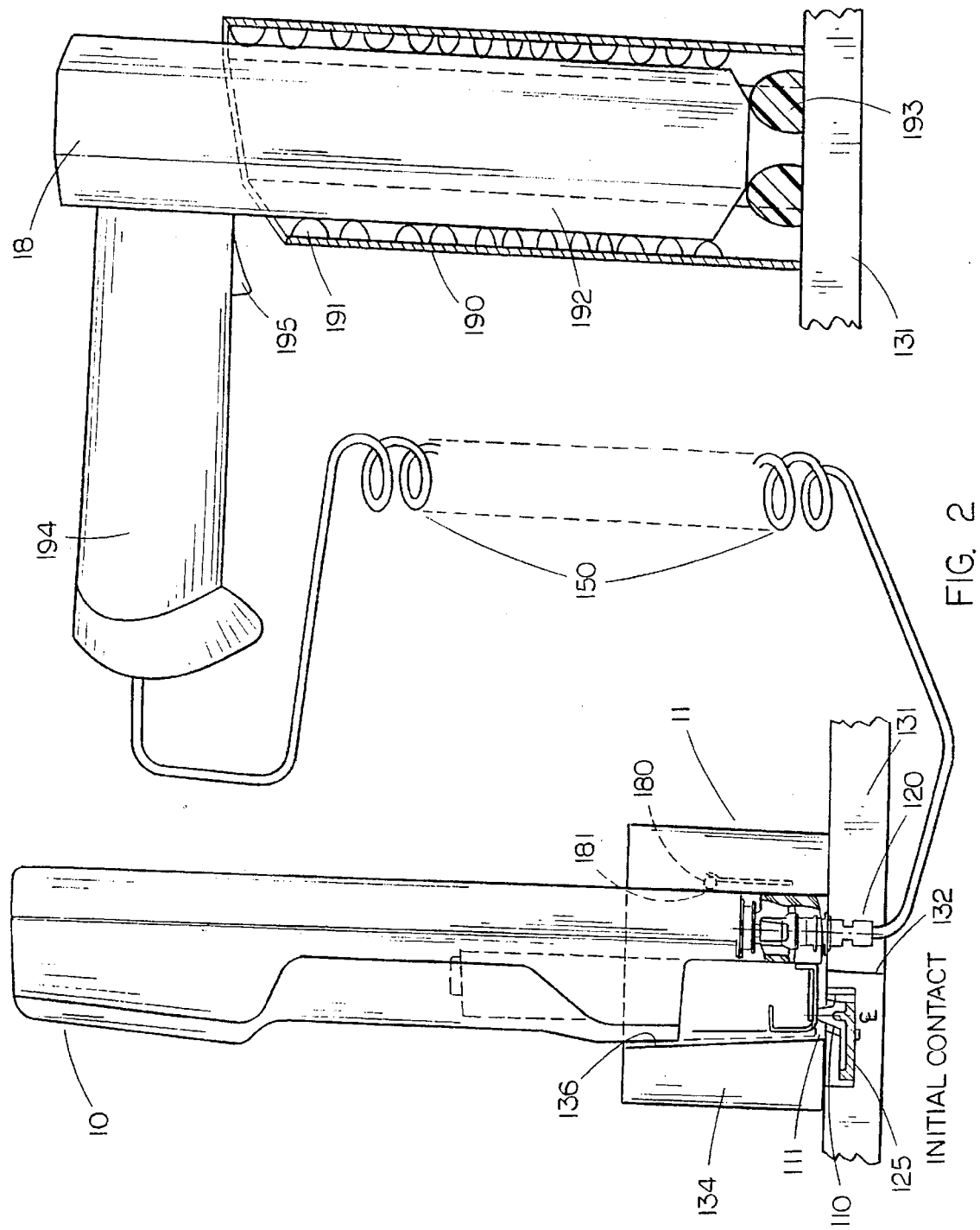
Figure 3:
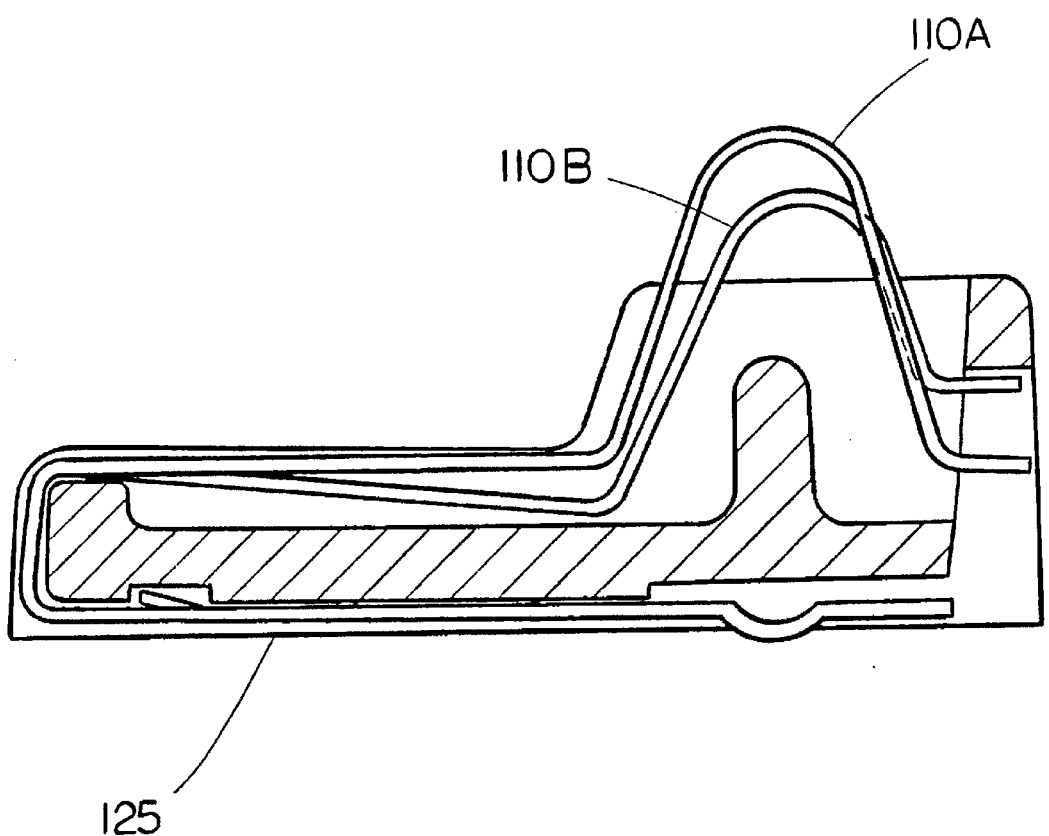
FIG. 3 is a somewhat diagrammatic longitudinal sectional view showing the contact assembly of the docking apparatus of FIG. 2 on a greatly enlarged scale.
Figure 4:
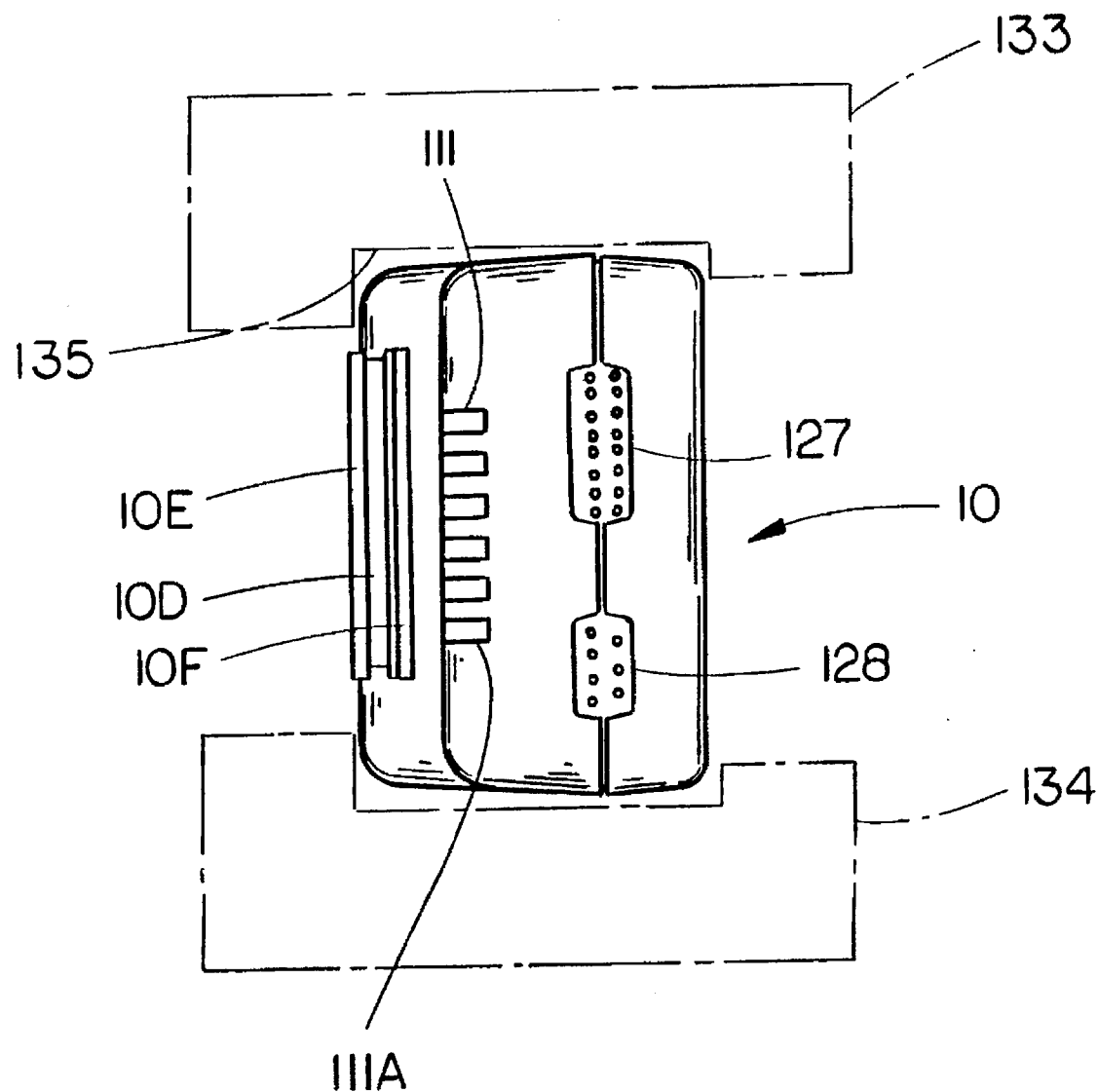
FIG. 4 is a diagrammatic bottom plan view of the terminal of FIGS. 1 and 2, illustrating the external contact pads of the terminal and also the connector fittings for coupling the terminal with a scanner such as the hand-held laser bar code scanner which is diagrammatically indicated in FIGS. 1 and 2.

Description of FIGS. 2, 3 and 4

A significant difference between the LAN configurations typically used for personal computer networking and communications, and the configuration described here for use with portable data terminals has to do with the mechanical connector method employed for interface to the electrical network. Presently common commercially available LAN products may utilize coaxial cables and connectors, twisted pair conductors with some type of connector termination or in some cases, telephone wire with modular phone jacks. Each of these physical interface methods requires a "fastening" and "unfastening" operation when the attached device is connected and unconnected from the network. An important feature of the portable LAN described here is in its method of electrical connection between the LAN and the connected portable terminal which must be removed and replaced often during operation. To eliminate the need for fastening and unfastening of a connector, in a preferred embodiment conductive contact pads 111 are exposed e.g., at an undersurface of each terminal such as terminal 10, FIG. 1, and each docking unit such as 11 is provided with spring loaded mating contacts 110. The docking unit holds the terminal securely in place while aligning the external contact pads 111 with the mating contacts fingers 110. An additional feature of the LAN interface docking unit for mobile mounting applications is in its "open face" which allows connection to a scanner such as 18, FIGS. 1 and 2, without impeding the placement and removal of the terminal from the docking unit. Thus referring to FIG. 2, terminal 10 is shown in initial contact with the docking unit indicated at 11, with a connector 120 leading to scanner 18 located in the open area of the docking unit. The docking unit may have a contact assembly 125 including spring fingers 110 aligned with respective terminal contact pads 111. FIG. 3 is an enlarged view of contact assembly 125 and shows the initial position of contact finger 110 at 110A, and shows a deflected position at 110B (the terminal being fully inserted into and frictionally held by the adapter to maintain the deflected condition 110B of the spring fingers).

FIG. 4 is a bottom plan view of the terminal 10, showing its set of contact pads such as 111, and showing connector fittings at 127 and 128 one of which may receive the scanner connector 120, FIG. 2. In FIGS. 2 and 4, docking unit 11 is shown as comprising a base part 131 which may be notched at 132 to accommodate scanner fitting 120, and a pair of upstanding generally C shaped parts 133 and 134 which define a channel 135 for receiving the terminal 10. The parts 133 and 134 may have sloping surfaces such as 136, FIG. 2, which limit the downward movement of a terminal into the receiving channel, and serve to frictionally retain the terminal with a suitable degree of pressure between contact pads such as 111 and mating spring fingers such as 110.

The present disclosure represents a significant improvement, for example in providing one or more mobile mount docking units such as 11, FIG. 1, 45, 46, 47, FIG. 3, and 70, FIG. 4, on a multi-drop data bus with diverse peripheral devices such as 12 to 15, FIG. 1, 49, FIG. 3, and 61 to 67, FIG. 4. Further, various devices may be added to the system on a dynamic basis during system operation, and assigned addresses as they become active on the network.

The conduit system containing the LAN data bus and power supply conductors may also contain a charging power line for supplying charging power to one of the contact fingers 110 which mates with the charging current input contact pad e.g., 111A, FIG. 4, of the terminal 10.

Discussion of Related Patent Application Concerning Battery Charging Control

A pending application of Steven E. Koenck "MICROPROCESSOR CONTROLLED FAST CHARGING SYSTEM" U.S. Ser. No. 07/266,537 filed Nov. 2, 1988, now abandoned, is a continuation in part of copending application Ser. No. 07/168,352 filed Mar. 15, 1988, now U.S. Pat. 4,885,523 issued Dec. 5, 1989, and the entire Disclosure of application Ser. No. 07/168,532 is incorporated herein by reference.

The twenty-seventh figure of the incorporated application shows a charging arrangement which may be applied to an individually manned transport vehicle with local area network system as taught herein. Thus terminal 10 of the present disclosure may incorporate the terminal system (27-10A) and battery pack (27-10B) of the twenty-seventh figure. A charger (27-22) may be mounted adjacent mobile mount docking unit 11 and receive charging power from the vehicle. Where the vehicle system supplies power at a relatively high voltage such as seventy-two volts, preferably such voltage is reduced to a lower voltage value such as twelve volts at a location near the vehicle power source and then power at such lower voltage value is supplied by a suitable cable to the charger component (27-22). In this embodiment, the charger has terminals labeled +CHARGE, TEMP, GND, CHG CONTROL which would be connected to four of the spring fingers 110, FIG. 2, of the mobile mount docking unit 11. The other two spring fingers 110 would be connected to the lines LAN+DATA and LAN−DATA of the twenty-seventh figure which would correspond with LAN data bus 16, FIG. 1. The LAN interface (27-39) of the twenty-seventh figure would include line driver/receiver 95, FIG. 6, which would receive +5 volts and the Power control signal from the microcomputer of the terminal system (27-10A) of the twenty-seventh figure.

Discussion of FIGS. 1–4

FIG. 1 illustrates vehicle data systems for vehicles such as forklift trucks and delivery vans which are utilized in product transport processes and the like. Such vehicles normally contain vehicle electric power means associated with the vehicle drive, e.g., a motive power engine-driven alternator or generator and vehicle storage battery for use in starting the engine, or electric storage batteries which themselves provide the propulsion energy. The vehicle power represented at 19 in FIG. 1 preferably is derived from the vehicle electric power means.

Vehicle power may also energize the LAN devices 12 to 15, FIG. 1, 45, 46, 47 and 49. In such a case vehicle power is supplied via suitable voltage regulator means as well as to microcomputer 98, for each device permanently associated with the LAN data bus in FIG. 1. Where components are part of a removable device such as terminal 10, FIG. 1, such components may be supplied from battery power carried with the removable device, or from charging power (+CHG) derived from the vehicle electric power means, e.g., 19 or 72. The local area network means of FIGS. 1 is preferably powered at least in part from vehicle electric power means and independently of fixed power sources.

While FIG. 1 shows an optical or RF scanner means 18 connected by a cable 150 and cable fitting 120 with a connector of the terminal 10 to form data terminal and scanner means, parts 10 and 18 may be in a single unit as shown for example in a pending application of Phillip Miller, et al, U.S. Ser. No. 07/136,097 filed Dec. 21, 1987, now abandoned, and as indicated at 5-10, FIG. 5 herein. The handle 5-15, FIG. 5 of the unit 5-10 may contain a series of external contacts corresponding to contacts 111, FIGS. 2 and 4, as indicated at 5-111, FIG. 5, for engaging with spring fingers corresponding to fingers 110, FIGS. 2 and 3. In this case, the receiving channel of the mobile mount docking unit of FIGS. 1 through 4 would frictionally receive the handgrip part 5-15 and support the horizontally extended under surface 5-15A, FIG. 5, of the scanner barrel, while providing adequate clearance so as to insure against actuation of the trigger 5-32 as the scanner and terminal means 5-10 is inserted into and removed from the various docking units. Convenient access to the card receptacle 5-20 of the scanner and terminal means 5-10 would thus be provided while the scanner and terminal unit 5-10 was in place in each docking unit. Also the scanner and terminal unit would be held securely to enable normal application of manual pressure to the keyboard segments 5-11B, FIG. 5. A display may be disposed at 5-50.

Alternatively, the mobile mount docking units may contain interface components such as 95, 97, 98 which are energized from vehicle power, and also alternatively an optical coupling may be provided between a light emitting diode and light sensor of the scanner and terminal unit 5-10 and the microcomputer 98 within each adapter for accommodating the interchange of data between the scanner and terminal unit 5-10 and the LAN data bus, e.g., to effect printout of data from the scanner and terminal unit on a printer such as 14, FIG. 1, 49, or to effect transmission of data.

The present invention may be implemented on an individually manned transport vehicle where the driver of the vehicle is the one concerned with operation of the on board devices. Since the driver at times must devote full attention to guidance of the vehicle, it is particularly appropriate that the data capture devices can be quickly inserted into and removed from mobile mount docking units, so that the driver may be completely unencumbered while driving the vehicle. It is advantageous to have a large area display which can be read at a distance e.g., from the driver seat of the vehicle. Such a display can provide information which is useful in moving from one work location to another, e.g., geographical type information; the display being positioned so that such information can be read at a glance e.g., during a brief stop of the vehicle while the driver remains at the controls of the vehicle.

Each of the connectors such as represented at 161 to 165, FIG. 1 may be a standardized quick-connect and quick-disconnect type so that docking units and devices may be interchanged and placed at desired locations about each type of individually manned transport vehicle. For example, each connection such as 161 may include a set of spring fingers such as 110 receiving the LAN+ and LAN- connections. Each device may then include an interface such as shown at 95, 97, 98, and power supply means for energizing these components from vehicle electric power, (vehicle electric power being available e.g., from a twelve-volt dc plug-in power receptacle adjacent each connection 161–169, 171–173).

Each connection such as 110, 111, FIG. 2, may be maintained by a frictional ball and socket type detent such as indicated at 180, FIG. 2, which seats with an audible click into a terminal recess 181 when correct deflection of spring contacts 110 has been achieved.

In the embodiment shown in FIG. 4, the RF terminal 10 has a connector 127 providing for signal communication according to the RS-232 format. In this way terminal 10 may be compatible with an earlier version of docking system utilizing pin and socket type connectors. Where the docking unit is to receive RF terminals according to FIG. 4 which are not equipped with a LAN interface such docking unit may be provided with a cooperating pin type connector 254 which is fully engaged with terminal connector 127, FIG. 4, when the terminal is inserted in channel 207 to the position established by detent means 250, 252.

When such transitional type terminal units are no longer required, the connector 254 may be dispensed with. An advanced type of RF terminal may omit both connectors 127 and 128, FIG. 4, so that the terminal is entirely free of recesses of the type indicated at 127 and 128 in FIG. 4. In this case, coupling to a separate reader unit such as 118 may be by means of a wireless link. All electrical contact type connections will then take place through contact pads such as 111, 111A, FIG. 4, which are generally flush with the exterior of the terminal unit for maximum imperviousness of the terminal to contaminants and mechanical damage.

Certain pin positions of connector 276 and the pins of power connector 277 may be connected via suitable interface circuitry with respective spring loaded contacts 232 so that all connections with a data terminal unit are via its contact pads such as 111, 111A, FIG. 4 as previously described e.g., with reference to FIG. 4. Other pin positions of connector 276 may connect with pin positions of connector 254 to accommodate transitional type terminals which are not equipped to operate exclusively via the open type abutting contact means 111, 111A, 232.

Where the terminal 10 has a hand strap as indicated at 10A, FIG. 4, the rails 234, 235, housing 241 may be configured to insure that such strap and its mounting parts do not interfere with insertion of the terminal into channel 207 of the terminal receptacle means 206. Thus rails 234, 235 may engage the terminal at regions such as indicated at 10d and 10e, FIG. 4.

The employment of detents 250 and 252 in cooperation with indentations in the terminal 10 permits frame 240 to be disposed in other than generally vertical orientation while still maintaining a secure retention of data entry terminal 10 in the docking unit with firm reliable inter-engagement of contact pads such as 111, 111A, FIG. 4, of data entry terminal 10 with contact elements 232 in spite of vehicle jarring and vibration.

Discussion Re FIG. 2

FIG. 2 shows a holster 190 on base 131 for receiving and securely retaining a scanner such as 18, e.g., by a resilient liner 191 of the holster 190 frictionally engaging with a barrel 192 of the scanner. The holster 190 may be constructed e.g., at 193 to hold the hand-grip part 194 and trigger 195 clear thereof so that the scanner of FIG. 2 is quickly and easily removed by manually grasping the hand-grip part 194, and so that the trigger 195 will not be actuated as the scanner is manually inserted into the holster.

The scanner for bar codes need not be physically attached to the terminal. In configurations for warehouse scanning systems, a lot of the software effort involved may represent the accommodation of the periodic removal of major sections of the system to do remote scanning of marginally accessible codes. In conventional practice the scanner is always attached to the terminal by a pendant cable and if the code to be scanned is beyond the reach of the cable then the terminal must necessarily be removed from its holster. The terminal may represent a very significant portion of a "LAN" system and to remove it in this fashion may disable the system generally. Placing the terminal in its holster again may entail the reestablishment of the hierarchical or virtual address structure that was established prior to the removal of the terminal. If, however, it is possible to only remove the scanner and to not be tied to the terminal by a cable then the degree of disability imposed upon the "LAN" system is significantly lessened and the software effort to develop such a system would be reduced.

The terminals now incorporate various types of scanner interfaces. Some of them have been add-on devices to accommodate scanner types manufactured by third parties. Others have been built-in and have been used to communicate with scanners such as shown in U.S. Pat. No. 4,766,300. Some of these hand-held terminal devices provide power converters accommodating the requirements idiosyncratic to specific scanner types. All of such scanners directly draw power from the terminal, reducing operational time per battery charge.

A scanner such as 18, FIG. 2, may be operated while disconnected from the terminal on a permanent basis. Terminals presently connect with a host by an RF link and maintain contact without benefit of cable. Of course, terminals mounted on a vehicle will be drawing their power from the vehicular electrical system. The power requirements for a scanner connected by cable to a terminal on a vehicle as in FIGS. 2 will not be a large factor in the power budget imposed upon the terminal.

Detaching the terminal from the scanner completely, provides benefits in the area of flexibility and ease of use. Since the scanner doesn't require contact with or attachment to the terminal the job of providing operating power no longer is the province of the terminal. The scanner, being completely portable would require its own battery pack but this pack would not have to be unusually capacious. Once the scanning function has been performed the scanner can be reinserted in its holster on the vehicle and charged back up to full capacity from vehicle power by its own charger.

The communication link replacing cable 150, FIG. 2, may be ultrasonic but could also be infrared or even another very low power RF link. Various modulation and demodulation schemes could be employed and the choice of the most appropriate means of encoding data on the channel would depend greatly upon the channel type used. Once the code had been read, the link between the scanner and the terminal could employ one of the various error checking and correcting procedures.

Physically the terminals would still incorporate a form of scanner interface but the link would not be mechanical. It would be desirable to provide a bi-directional data path. The scanner would include the matching interface to implement the link and using a bi-directional data path the scanner could receive an acknowledgment after a scan. Reception of such an acknowledgment would constitute an indication of a valid scan and the illumination of an indicator light would provide operator feedback. The lack of a response from the terminal in a specified time period would constitute a negative acknowledgment and another indication on the scanner would signal the operator that another scan was necessary.

Appropriate scanners for this type of operation would include current wand and modified CCD type scanners of Norand Corporation and a number of other manufacturer's laser scanners. This scanner would be used typically, by a forklift operator in close proximity to his vehicle. Limited range would not be a significant deterrent here and may even be a benefit in an operation where It will be apparent that many modifications and variations may be effected without departing from the scope of the novel teachings and concepts of the present disclosure.

We claim as our invention:

1. In a data capture system, an indicia reading terminal for reading indicia having parts of different light reflectivity, said indicia reading terminal having a rechargeable battery and comprising:
   (a) a generally gun-shaped housing having an elongated body portion including a proximal region, and a distal region in front of the proximal region, and a handle portion connected to the body portion to enable an operator to hold the housing and aim the body portion at the indicia located at a distance from the front of the housing;
   (b) an optical reader for receiving reflected light along a light path from the indicia to produce electrical signals representative of the indicia; and
   (c) a user actuated input section disposed on the proximal region of the housing out of the light path for enabling operation by the user without blocking the reflected light path;
   (d) the reading terminal having charging contacts arranged so that battery charging can be effected while the user actuated input section remains accessible to the user;
   (e) a charging and communicating docking receptacle for engaging portions of the reading terminal other than the user actuated input section so that battery charging can be effected via the charging contacts while the user actuated input section remains accessible to the user; and
   (f) said docking receptacle having a slot accommodating the handle portion of the reading terminal, with surface portions of the receptacle confronting surface regions of the terminal to support the terminal with respect to manually produced actuating forces applied to said input section.

2. In a data capture system according to claim 1, said housing having the user actuated input section inclined so as to rise in elevation as considered in a direction from a rear region of the housing toward the distal region of the housing.

3. In a data capture system according to claim 2, said proximal region having a display which extends from near the rear region of the housing toward the distal region of the housing.

4. In a data capture system according to claim 1, said proximal regional having a display which extends from near a rear region of the housing toward the distal region of the housing.

5. In a data capture system according to claim 2, said terminal having a card receptacle at the distal region of the housing which remains accessible while the terminal is supported in said charging and communicating docking receptacle.

6. In a data capture system according to claim 1, said terminal having a card receptacle at the distal region of the housing which remains accessible while the terminal is supported in said charging and communicating docking receptacle.

7. In a data capture system according to claim 1, the handle portion of the terminal having a manual actuator thereon, and said slot receiving said manual actuator therein while opening in a direction to provide clearance therefor.

8. In a data capture system, an indicia reading terminal for reading indicia having parts of different light reflectivity, said indicia reading terminal having a rechargeable battery and comprising:
   (a) a housing having an elongated body portion including a proximal region, and a distal region in front of the proximal region;
   (b) an optical reader for receiving reflected light along a reflected light path from the indicia to produce electrical signals representative of the indicia; and
   (c) a user actuated input section disposed on the proximal region in the housing out of the light path for enabling operation by the user without blocking the reflected light path;
   (d) the reading terminal having generally the shape of a pistol with charging contacts arranged so that battery charging can be effected while the user actuated input section remains accessible to the user;
   (e) a charging and communicating docking receptacle for engaging the reading terminal other than at the user actuated input section so that battery charging can be effected via the charging contacts while the user actuated input section remains accessible to the user; and
   (f) said docking receptacle having an open channel receiving a portion of the reading terminal, with surface portions of the receptacle confronting surface regions of the terminal to support the terminal with respect to manually produced actuating forces applied to said input section.

9. In a data capture system according to claim 8, said reading terminal having a handle with a manual actuator thereon, said receptacle receiving the handle and actuator but having an open slot region providing clearance for said actuator.

10. In a data capture system according to claim 8, said housing having the user actuated input section inclined so as to rise in elevation as considered in a direction from a rear region of the housing toward the distal region of the housing.

11. In a data capture system according to claim 8, said proximal region having a display which extends from near a rear region of the housing toward the distal region of the housing.

12. In a data capture system according to claim 8, said terminal having a card receptacle at the distal region of the housing which remains accessible while the terminal is supported in said charging and communicating docking receptacle.

\* \* \* \* \*